Figure 1:
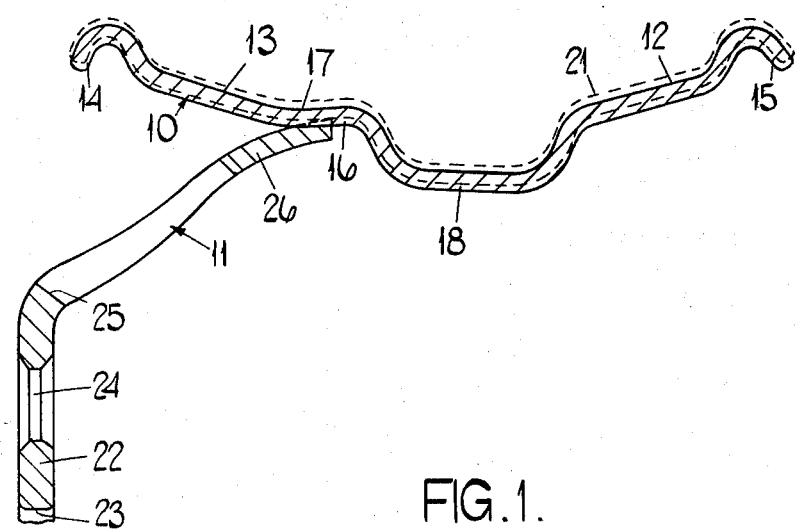

United States Patent [19]

Bache

[11] 4,106,172

[45] Aug. 15, 1978

[54] VEHICLE WHEELS

[75] Inventor: William Harry Bache, Cookley, near Kidderminster, England

[73] Assignee: Steel Stampings Limited, England

[21] Appl. No.: 784,820

[22] Filed: Apr. 5, 1977

[30] Foreign Application Priority Data

Apr. 7, 1976 [GB] United Kingdom ............... 14041/76
May 15, 1976 [GB] United Kingdom ............... 20178/76
Jun. 1, 1976 [GB] United Kingdom ............... 22670/76

[51] Int. Cl.² .................... B23K 19/00; B21H 1/10; B21K 1/38
[52] U.S. Cl. ................ 29/159.01; 29/159.1; 228/112; 301/63 R
[58] Field of Search ............ 29/159.01, 159.1; 228/112, 114, 265, 2, 113

[56] References Cited

U.S. PATENT DOCUMENTS

| | | | |
|---|---|---|---|
| 3,235,312 | 2/1966 | Hollander | 29/159.1 X |
| 3,611,535 | 10/1971 | Nobach | 29/159.01 |
| 3,805,371 | 4/1974 | Edwards | 228/112 |
| 3,896,986 | 7/1975 | Edwards | 228/112 X |
| 3,964,144 | 6/1976 | Kopp | 29/159.1 |

Primary Examiner—Milton S. Mehr

[57] ABSTRACT

The invention relates to a method of producing a vehicle wheel which includes two components to be friction welded together, the method comprising placing the components together so that respective surfaces thereon to be joined by friction welding are in proximity to one another then rotating one of the parts relatively to the other and then causing radial movement of one of the components towards the other by shrinking or by expansion to bring them into contact at the respective surfaces so that these are heated and then stopping the relative rotation so that they become welded together. The invention also concerns the resultant vehicle wheel product and apparatus for carrying out the method.

27 Claims, 7 Drawing Figures

VEHICLE WHEELS

This invention relates to vehicle wheels, in particular, though not exclusively, for heavy commercial and off the road vehicles. Such wheels comprise at least a rim portion and a disc or ring within the rim and which, in use, is secured to a wheel hub in conventional manner.

There are many wheels of this kind in existence and in one form for which the invention is of particular use, the rim has a drop centre and an adjacent cylindrical ledge, the disc or ring being welded to the interior of the rim at this ledge position.

There have been many proposals for producing wheels of this particular kind since it has been found that it has good strength characteristics as well as providing adequate clearance for a brake drum within the cavity defined within the wheel. One particular wheel of this kind has a cylindrical peripheral portion on the disc which is welded by at least one fillet weld, to the correspondingly cylindrical inside surface of the ledge on the rim. The position of the weld or welds must be accurate in order to achieve both axial and radial accuracy of the completed wheel. Particularly on the smaller sizes of rims, access for welding is furthermore somewhat restricted.

It is a primary object of the invention to provide a method of producing vehicle wheels which have good strength characteristics and which can be accurately produced in large quantities.

According to this aspect of the invention a method of producing a vehicle wheel constructed with at least two components to be friction welded together, the method comprising forming said components of the wheel separately, placing them in assembled relationship with respective surfaces thereon to be friction welded together in proximity to one another, causing relative rotation between said components about an axis coincident with the axis of the finished wheel, creating relative radial movement of the surfaces towards one another to bring them into contact to generate heating at these surfaces and then stopping the relative rotation of the components to produce a friction weld between the said surfaces.

A further object is to provide a vehicle wheel in an accurate and strong form.

In accordance with this aspect a vehicle wheel is produced by the method defined in the previous paragraph.

According to a still further aspect of the invention there is provided appartus for producing vehicle wheels by the method defined in the previous paragraph.

Figure 2:
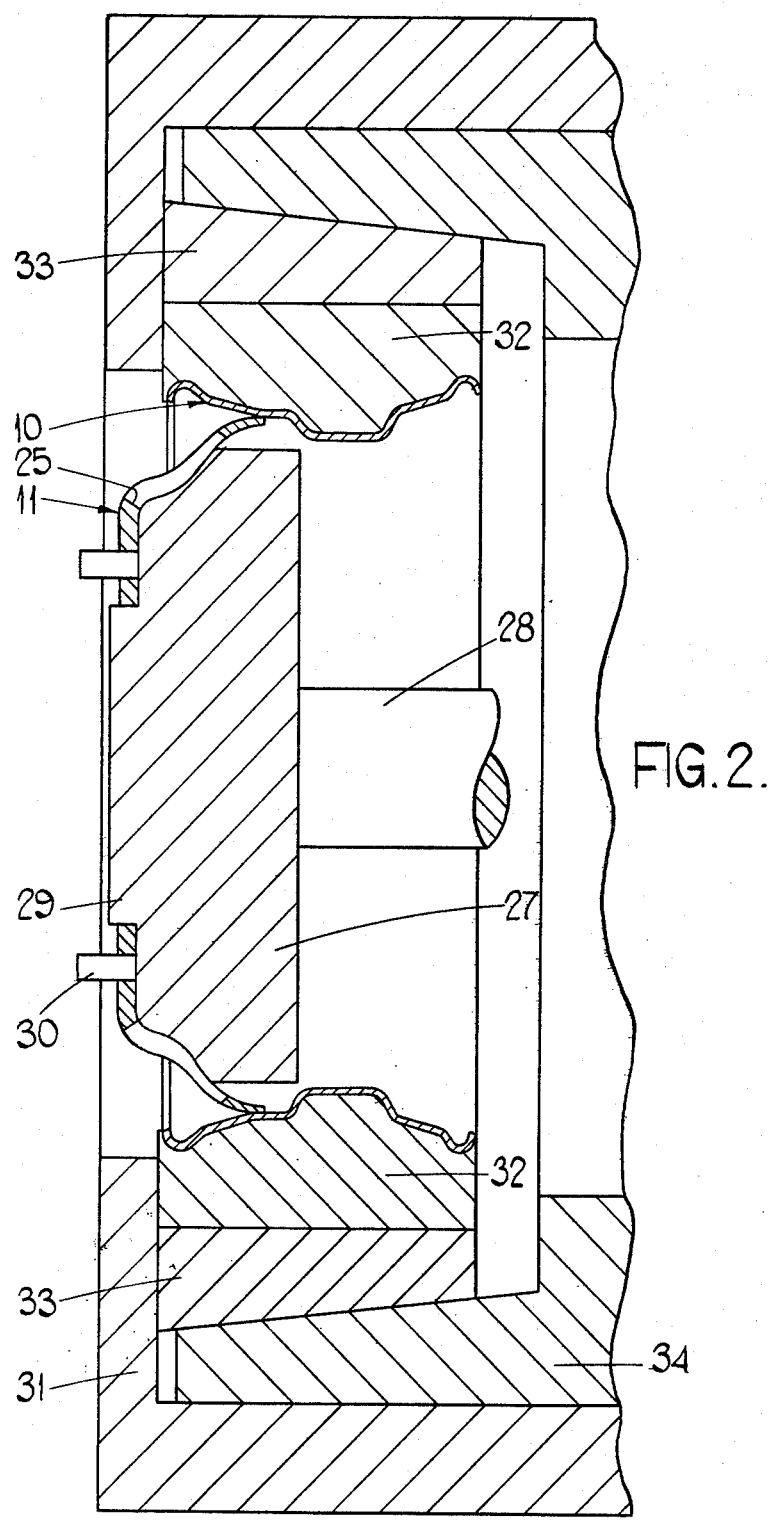
Figure 3:
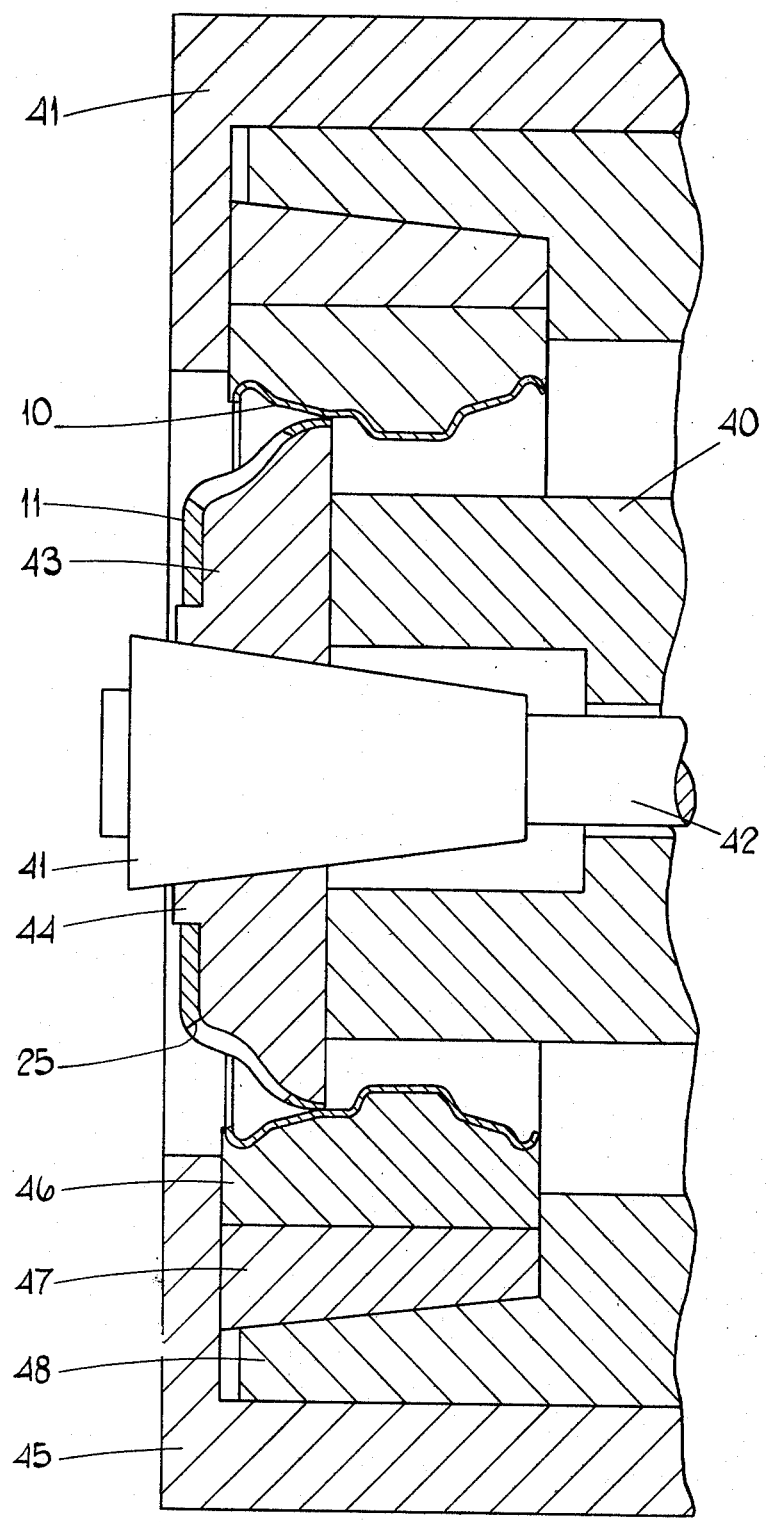
Figure 4:
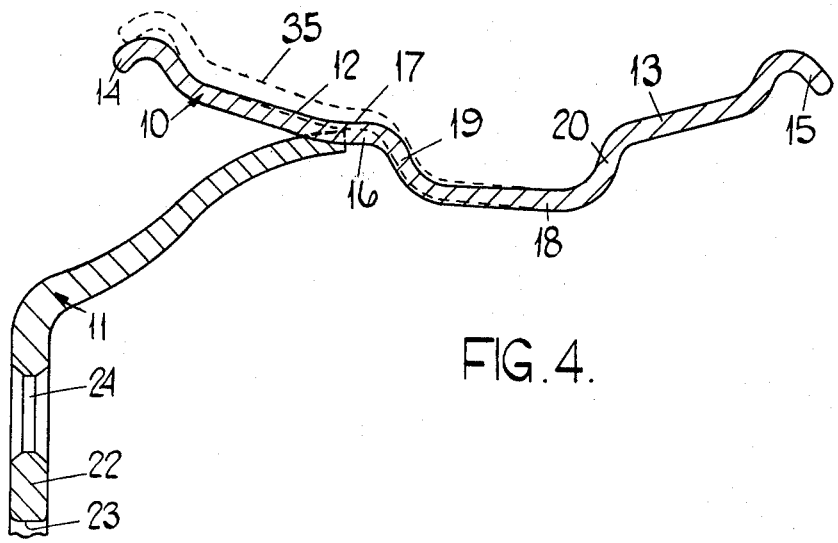
Figure 5:
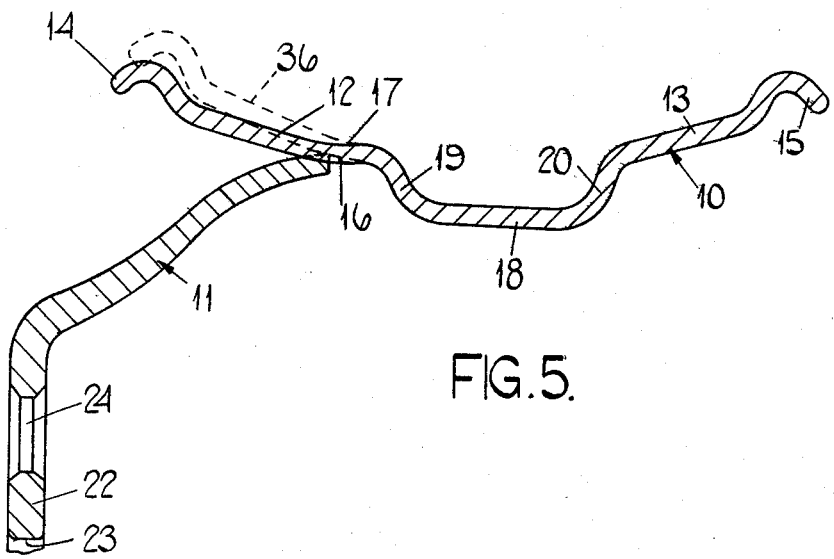
Figure 6:
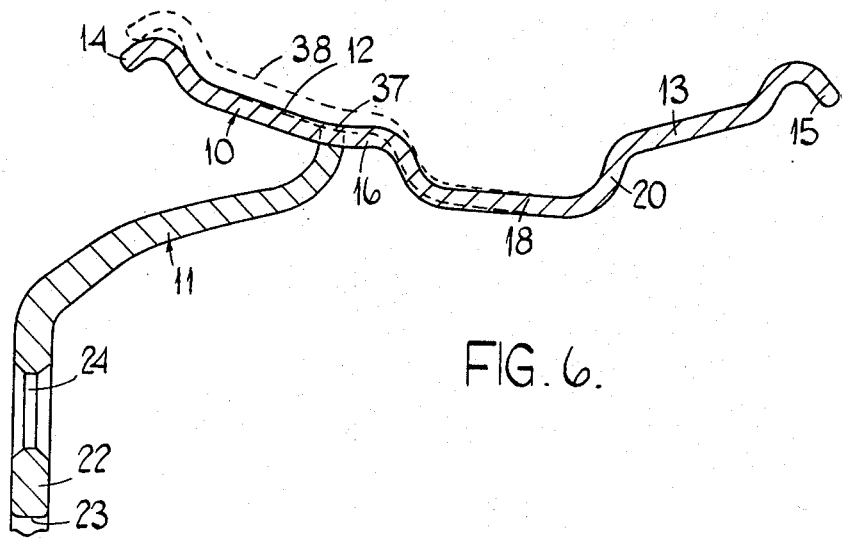
Figure 7:
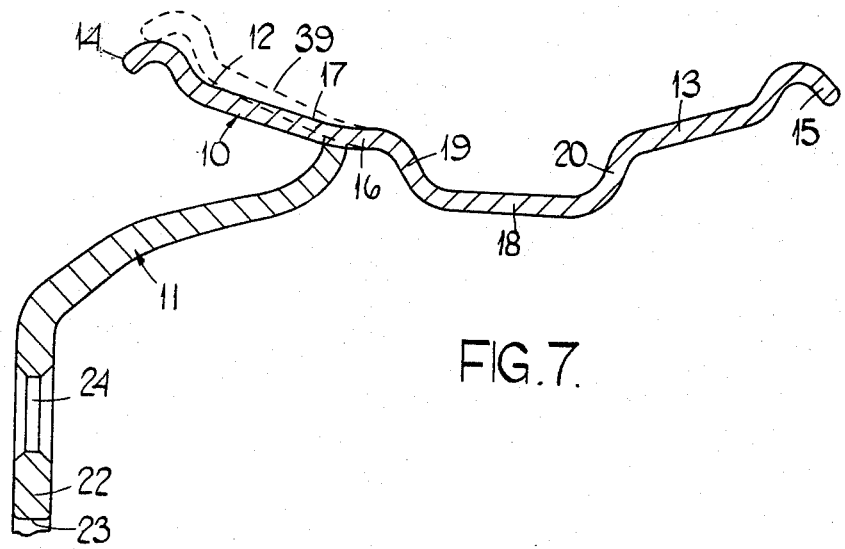

The invention will now be described by way of example with reference to the accompanying drawings in which:

FIG. 1 is a cross-sectional view of a vehicle wheel constructed in accordance with the invention, FIG. 2 is a cross-sectional view, on a smaller scale, of apparatus for making vehicle wheels, according to the invention, FIG. 3 is a cross-sectional view of an alternative apparatus for making vehicle wheels, according to the invention, FIG. 4 is a similar view to FIG. 1 constructed in a different manner, FIG. 5 is a similar view to FIG. 1 constructed in a further manner, FIG. 6 is a similar view to FIG. 1 showing a different wheel and FIG. 7 is a similar view to FIG. 6 showing the same wheel constructed in a different manner.

The wheels shown in all of the figures are for commercial vehicles and are of the kind referred to as 15° asymmetrical well based wheels or drop centre type wheels. In each figure the rim is identified at 10, and the disc welded to it is 11.

The rim comprises a pair of tyre bead seat surfaces 12, 13 which extend at 15° to the axis of the wheel. Joined to the bead seat portions are respective generally U-shaped lips 14, 15, of which one limb of the U is joined to the bead seat portion, and the other limb is turned back towards the centre of the wheel. The bead seat 12, is joined to a ledge 16, which is cylindrical. The junction of the cylindrical ledge and the inclined bead seat 12, is identified at 17.

Between the ledge 16 and the other bead seat 13, is a drop centre well portion 18. This has a cylindrical base and two side walls 19, 20. All portions of the rim are joined to their adjacent portions by respective radiused sections.

The rim is constructed from initially flat substantially uniform thickness steel stock which is coiled to form a generally cylindrical band. The ends are welded together and then it is cold rolled to the required profile, as shown.

The disc 11, is deeply dished as shown and has a cross-section tapering from the flat central hub zone 22, towards its periphery. In other examples the disc may be of even thickness throughout. The central zone 22 is provided with a central circular hole 23. There are furthermore a number of holes 24 on a pitch circle of which the centre coincides with the centre of the hole 23. Each hole 24 is chamfered at both sides, as shown. The disc may also include lightening holes 25 shown only in the construction illustrated in FIGS. 1, 2 and 3. In other examples the holes 24 may be plain cylindrical or chamfered only on one side.

Referring specifically to the construction of FIGS. 1 and 2 it will be seen that the rim 10 is initially formed with the profile larger in diameter than that which it has in the finished wheel. This initial large size is indicated by the dotted lines 21. The oversize is of the order of half an inch.

The periphery of the disc 11 is extended axially to provide a portion 26. As shown in FIG. 1 this can be engaged within the cylindrical portion 16 of the rim, in the enlarged condition of the rim.

FIG. 2 shows the apparatus for producing the wheel of FIG. 1. This apparatus comprises an inner member 27 connected to a driving shaft 28. At the opposite side from the driving shaft the member 27 has an integral, cylindrical spigot 29 onto which the wheel disc can be engaged. The spigot has an external cylindrical surface which is a close fit with the central hole 23 in the disc 11 of the wheel. The face of the member 27 is moreover shaped with the profile of the interior of the disc 11. Surrounding the central spigot 29 are a number of pegs 30 which can engage in respective holes 24 in the disc. As shown in FIG. 2, they are shown engaged in this way and they serve to prevent relative rotation between the member 27 and the disc 11.

Surrounding the member 27 is a stationary part 31 within which is mounted a shrinking device. The shrinking device includes a plurality of blocks 32 which when placed together form a continuous ring. Each block is formed on its internal face with a profile matching the external profile of the rim 10. The external surfaces of the blocks 32 are part cylindrical. Engaging such external surfaces of the blocks 32 is a ring of wedges 33 having internal part cylindrical surfaces and external part conical surfaces. Surrounding the wedges is a continuous ring 34. This has an internal part conical surface to engage the wedges 33 and of substantially the same taper and the external surface is cylindrical. Such external surface engages in a complimentary cylindrical surface of the part 31. It is arranged that the ring 34 can be moved axially so as in one direction to move the wedges 33 inwardly and in the other direction to allow them to move outwardly. Inward movement of the wedges 33 in turn causes the ring of blocks 32 to move inwardly and this is used to shrink the rim 10. The degree of shrinkage is indicated in FIG. 1 between the dotted lines 21 and the full line profile. Power means such as mechanical, hydraulic pneumatic or electrical means are provided for moving the ring 34 axially. The shrinking device may be of conventional kind and other shrinking devices creating the same uniform shrinking effect may be used. It is however essential that the concentricity of the rim 10 with respect to the centre of rotation of the member 27 and therefore of the disc 11 should be maintained so that finished wheels are concentric. Furthermore, the shrinking means is arranged to ensure that no relative axial movement takes place between the rim 10 and the disc 11.

The method of production of wheels with this apparatus comprises first forming the two components, the rim 10 and the disc 11 separately. The rim is formed as previously mentioned with the correct profile but of the order of half an inch larger than the required shape of the finished wheel. The disc is formed by pressing or other convenient means and the central hole 23 is accurately machined so that its centre coincides with the centre of the cylindrical external portion 26 of the disc. Both flat surfaces of the central portion 22 of the disc are machined exactly perpendicular to the axis and the holes 24 with their chamfers are also formed. These operations on the disc are carried out before assembly of the disc to the rim and this is an advantage over known wheel manufacture in which it is usual to carry out such machining after assembly of the disc into the rim.

The disc is now mounted on the member 27. The shrinking device is released so that the blocks 32 can move outwardly sufficiently to accept the rim 10. Next the rim and disc are brought into proximity into the position shown in FIG. 2. The member 27 carrying the disc 11 is now rotated at high speed the rim remaining stationary. Since the interior surface of the ledge 16 is in contact with the external cylindrical surface of the portion 26 of the rim, heating of these two surfaces occurs. The heating is substantially confined to the areas of contact and with increasing speed of rotation of the inner member 27 the surfaces soon attain a very high temperature.

As the temperature increases the shrinking device becomes operative to shrink the rim inwardly, producing substantial frictional forces at the respective surfaces of the rim and disc. Sufficient heat is generated to create a friction weld at the surfaces and when the rim has been shrunk to the required profile, as indicated by full lines in FIG. 1, rotation of the inner member is stopped. A friction weld will be created which is uniform around the wheel. When the metal has hardened, the wheel is removed from the apparatus and will normally require no further machining or forming.

The apparatus permits production of very accurate wheels since the components are held in their correct relationship during the welding process. A high degree of accuracy is thus achieved both radially and axially.

In the alternative arrangement shown in FIG. 4, the rim 10 is initially formed with the correct final profile at one side but with an enlarged profile in the region at which the friction weld is to take place. The position at which the enlargement occurs is from the base of the drop centre well 18. The enlarged profile is indicated by numeral 35. The shrinking device is arranged to provide shrinkage only in the region indicated so that the rim takes up the profile shown in full lines in FIG. 4.

In the construction shown in FIG. 5, there is shown a similar rim and disc but the rim is initially formed with an enlarged profile only from the point of junction between the wall 19 of the well 18 and the ledge 16. The enlargement of this portion of the rim is shown rather larger than that in the other constructions. The shrinking device is arranged to provide for shrinking only of this portion of the rim.

In FIG. 6, a different form of disc 11 is shown. This has its external edge turned outwardly to form a cylindrical or near cylindrical external edge surface 37. This engages the interior of the cylindrical ledge 16. In the examples shown in FIG. 6, the rim 10 has an initial profile indicated by the dotted lines 38 including an enlargement from the well base in similar manner to the construction shown in FIG. 4. Because the profile is enlarged in this region, the interior surface of the ledge 16 does not initially have a cylindrical form. Consequently, the edge of the disc 11 has its surface 37 formed at a slight angle to the axis of the wheel so as to provide surface contact for friction welding.

FIG. 7 shows a similar arrangement in which, however, the enlargement of the rim as indicated by the dotted lines 39 is from the junction of the wall 19 of the well and the ledge 16 in similar manner to the construction shown in FIG. 5.

It is, however possible, with the disc form shown in FIGS. 6 and 7 to shrink the whole rim as described in relation to FIGS. 1 and 2.

In a further alternative arrangement provision is made for expansion of the interior of the dished disc so that its external surface engages the ledge 16 interior surface to produce friction and consequently a friction weld at this position. Apparatus for this is shown in FIG. 3. Such an arrangement is particularly applicable to the construction of disc shown in FIGS. 1, 2, 3 and 4 in which it terminates at its external periphery in a generally cylindrical extension.

This includes an inner rotating assembly comprising a collar 40, within which is a frusto conical part 41 secured to a rod 42. Engaging the end of the collar 40 and also the tapered surface of the part 41 are a number of blocks 43. Each block has a profile corresponding with the shape of the interior of the disc 11 of the wheel. The blocks 43, moreover, define a composite spigot 44 engageable in the centre hole of the disc. The internal forms of the blocks 43 are part conical to co-operate with the similarly tapered surface of the part 41. The whole of the assembly comprising the collar 40, part 41, blocks 43 and the wheel disc 11 is rotatable. Furthermore, the rod 42 is movable axially to move the blocks 43 in or out to expand or contract within the disc 11. The blocks 43 are shaped to engage within the disc out to the cylindrical peripheral portion and can cause radial movement particularly of this portion. Provision is made to prevent rotation of the disc 11 with respect to the blocks and this may take the form of members (not shown) extending into the lightening holes 25.

The rim 10 is supported by a stationary part 45 containing blocks 46 profiled to match the rim shape and held by wedge pieces 47 and a tapered ring 48. Though similar to the FIG. 2 shrinking device, this does not perform the shrinking function but merely acts as a chuck to retain the rim in its correct position.

This apparatus may be modified to expand only a local portion of the disc and may also be modified to fit discs of the kind shown in FIGS. 6 and 7 to a rim.

The methods described are applicable to wheels of different form to those shown. The disc may be replaced by a ring which is in turn connected by conventional means such as a row of bolts to an inner component which in turn is connected to the hub of the vehicle. It is moreover, possible to friction weld by the method described, two components of the wheel other than the rim and disc. In a construction including a ring to replace the disc, this ring may be friction welded by the method to the inner component. Any two concentric components of a wheel can be friction welded by the method.

Though applicable to wheels for heavy commercial road vehicles the method may also be used to manufacture large off the road vehicle wheels such as earthmover wheels. Similarly, it may be applicable to wheels for smaller vehicles.

The construction of the rim and of the disc are also variable. In the construction illustrated, the rims are formed from flat strip. However, rims produced from hot rolled profiled section may be connected to discs in the manner described. The rims and discs may be formed by other means such as by pressing.

The disc external periphery may, moreover, be made up of a series of portions spaced by recesses or holes and in this case the weld is discontinuous.

In the shrinking process, the shrinking may take place relatively slowly to bring the rim or portion thereof almost into its required position whereupon the shrinking is allowed to take place more quickly and it is at this point that the relative rotation is stopped. The process may be applied to wheel components constructed from materials other than steel as described. Dissimilar materials may be welded together by this method.

I claim:

1. A method of producing a vehicle wheel constructed with at least two components to be friction welded together, the method comprising forming said components of the wheel separately, placing them in assembled relationship with respective surfaces thereon to be friction welded together in axial and radial proximity to one another, causing relative rotation between said components about an axis coincident with the axis of the finished wheel, maintaining at least said surfaces to be friction welded together against axial movement during rotation, creating concentric radial movement of one of the surfaces towards the other surface to bring them into contact to generate heating at these surfaces and then stopping the relative rotation of the components to produce a friction weld between the said surfaces.

2. A method as claimed in claim 1 in which the two surfaces to be friction welded together are substantially concentric cylindrical surfaces on the two components respectively.

3. A method as claimed in claim 1 in which the relative radial movement is created by shrinking the outer one of the components.

4. A method as claimed in claim 3 in which only that portion of the outer component on which the surface is provided thereon is shrunk.

5. A method as claimed in claim 3 in which the whole of the outer component is shrunk.

6. A method as claimed in claim 1 in which the relative radial movement is created by expanding the external edge of the inner component.

7. A method as claimed in claim 1 in which the relative rotation is caused by rotating the inner one of the two components, while the outer component is held against rotation.

8. A method as claimed in claim 7 in which the inner component is mounted on a rotary member and is provided with formations to prevent rotation of the rotary member relatively to said inner component.

9. A method as claimed in claim 1, wherein the one component is a rim and the second component is a disc or ring wherein the interior of the rim and exterior of the disc or ring are provided with said surfaces respectively, the disc or ring being friction welded into the rim.

10. A method as claimed in claim 9 in which the rim and disc or ring are formed with respective cylindrical portions on which said surfaces, which are also cylindrical, are formed.

11. A method as claimed in claim 9 in which the interior surface of the rim is formed with said one surface and the other surface is formed at the peripheral edge of the disc or ring.

12. A method as claimed in claim 9 in which the disc or ring has a centre hole machined to concentricity with said surface thereon before being placed in assembled relationship with said rim.

13. A vehicle wheel comprising a first component and a second component arranged in assembled relationship with their respective surfaces in radial and axial proximity by relative rotation of said components and simultaneous concentric radial movement of one component relative to the other, whereby integral and radial contact between the surfaces is effected.

14. A vehicle wheel as claimed in claim 13 including a rim of drop centre type.

15. A vehicle wheel as claimed in claim 14 in which the rim has a cylindrical ledge located adjacent to the drop centre, to the interior cylindrical surface of which the disc or ring is friction welded.

16. A vehicle wheel as claimed in claim 15 in which the disc or ring has an external cylindrical portion friction welded to the interior of said cylindrical ledge on the rim.

17. A vehicle wheel as claimed in claim 15 in which the disc or ring has an external cylindrical edge which is friction welded to the interior of said cylindrical ledge on the rim.

18. Apparatus for producing vehicle wheels having friction welded surfaces comprising means for holding a pair of wheel component means for rotating said component about a central axis, said components having respective peripheral surfaces spaced from each other to be friction welded together, means for maintaining said components against axial movement during rotation and means for simultaneously moving at least the surface of one of said components concentrically radially relative to the other until said surfaces abut, and means for stopping said rotaton to effect welding of the abutting surfaces.

19. Apparatus as claimed in claim 18 in which there is means for holding the outer component against rotation and means for rotating said inner component.

20. Apparatus as claimed in claim 19 including means for preventing rotation between said inner component and a member forming part of said apparatus, for imparting rotation to said inner member.

21. Apparatus as claimed in either of claim 19 including a shrinking device for shrinking the outer one of said components.

22. Apparatus as claimed in claim 21 in which the shrinking device is arranged to shrink only part of said outer component.

23. Apparatus as claimed in claim 21 in which said shrinking device is arranged to shrink the whole of said outer component.

24. Apparatus as claimed in any one of claim 21 in which the shrinking device includes a plurality of blocks having wedge means coacting with them, to bring them inwardly to shrink the outer component while maintaining its concentricity with respect to the axis about which relative rotation of the components takes place.

25. Apparatus as claimed in any one of claim 18 including means for expanding the peripheral edge of the inner component.

26. Apparatus as claimed in claim 25 in which the means for expanding is a tapered member acting on blocks which engage the interior of said inner member and force its external peripheral edge outwardly into contact with the interior of the outer component.

27. A method of producing a vehicle wheel constructed with at least two components to be friction welded together, the method comprising forming said components of the wheel separately, each having a cylindrical surface which is to be welded to the other, placing them in assembled relationship with respective cylindrical surfaces thereon to be friction welded together in axial and radial proximity to one another, causing relative rotation between said components about an axis coincident with the axis of the finished wheel, maintaining at least said cylindrical surfaces to be friction welded together against axial movement during rotation, while simultaneously creating concentric radial movement of one of the cylindrical surfaces towards the other cylindrical surface to bring them into contact to generate heating at these surfaces and then stopping the relative rotation of the components to produce a friction weld between the said cylindrical surfaces.

* * * * *